(12) United States Patent
Yu (10) Patent No.: US 9,407,369 B2
(45) Date of Patent: Aug. 2, 2016

(54) OPTICAL CONVERTER WITH ADC BASED CHANNELIZER FOR OPTICAL LNB SYSTEM

(75) Inventor: Tommy Yu, Orange, CA (US)

(73) Assignee: ENTROPIC COMMUNICATIONS, LLC, Carlsbad, CA (US)

(*) Notice: Subject to any disclaimer, the term of this patent is extended or adjusted under 35 U.S.C. 154(b) by 228 days.

(21) Appl. No.: 13/397,443

(22) Filed: Feb. 15, 2012

(65) Prior Publication Data

US 2012/0213514 A1 Aug. 23, 2012

Related U.S. Application Data

(60) Provisional application No. 61/443,500, filed on Feb. 16, 2011.

(51) Int. Cl.
*H04B 10/105* (2006.01)
*H04J 14/00* (2006.01)
*H04B 10/118* (2013.01)

(52) U.S. Cl.
CPC .................................. *H04B 10/118* (2013.01)

(58) Field of Classification Search
USPC .................................................. 398/121, 125
See application file for complete search history.

(56) References Cited

U.S. PATENT DOCUMENTS

| | | | |
|---|---|---|---|
| 5,856,804 A | 1/1999 | Turcotte et al. | |
| 6,016,426 A * | 1/2000 | Bodell | 455/422.1 |
| 6,094,158 A | 7/2000 | Williams | |
| 6,191,781 B1 | 2/2001 | Chaney et al. | |
| 6,198,449 B1 | 3/2001 | Muhlhauser et al. | |
| 6,205,185 B1 | 3/2001 | Kajiwara | |
| 7,075,585 B2 | 7/2006 | Favrat et al. | |
| 7,145,972 B2 | 12/2006 | Kumar et al. | |
| 7,272,375 B2 | 9/2007 | Tuttle et al. | |
| 7,477,871 B1 | 1/2009 | Gurantz et al. | |
| 7,620,127 B1 | 11/2009 | Koenck et al. | |
| 7,623,580 B2 | 11/2009 | McNaught-Davis Hess et al. | |
| 7,848,303 B2 | 12/2010 | Lindstrom et al. | |
| 2004/0041554 A1 | 3/2004 | Miyauchi | |
| 2004/0042557 A1 * | 3/2004 | Kabel et al. | 375/260 |
| 2005/0094714 A1 | 5/2005 | Robinson | |

(Continued)

FOREIGN PATENT DOCUMENTS

WO 2012100220 A2 7/2012
WO 2012100220 A3 10/2013

OTHER PUBLICATIONS

International Search Report and Written Opinion for International Application PCT/US2012/025268, Report Completed Apr. 9, 2012, 6 pgs.

(Continued)

*Primary Examiner* — Shi K Li
*Assistant Examiner* — Mina Shalaby
(74) *Attorney, Agent, or Firm* — McAndrews, Held & Malloy, Ltd.

(57) ABSTRACT

Systems and methods in accordance with embodiments of the invention convert satellite signals to an intermediate frequency signal and selecting modulated digital data within the satellite signals for content decoding. One embodiment includes an optical low noise block converter (LNB) including a digital channelizer switch configured to select at least one content channel from an input signal including a plurality of content channels modulated onto a carrier and to output an optical signal including the selected at least one content channel.

18 Claims, 9 Drawing Sheets

(56) References Cited

U.S. PATENT DOCUMENTS

| | | |
|---|---|---|
| 2005/0190777 A1 | 9/2005 | Hess et al. |
| 2006/0003728 A1 | 1/2006 | Tuttle et al. |
| 2007/0064157 A1 | 3/2007 | Kasamatsu et al. |
| 2010/0107211 A1* | 4/2010 | Chou .......................... 725/129 |
| 2010/0172446 A1 | 7/2010 | Popoli |
| 2010/0303181 A1 | 12/2010 | Yu |
| 2011/0283330 A1* | 11/2011 | Wang .............................. 725/69 |
| 2012/0163290 A1* | 6/2012 | Krafft et al. .................. 370/316 |
| 2012/0189084 A1 | 7/2012 | Yu |
| 2012/0236845 A1* | 9/2012 | Li et al. ........................ 370/352 |
| 2014/0328437 A1 | 11/2014 | Yu |

OTHER PUBLICATIONS

International Search Report and Written Opinion for International Application PCT/US2012/22109, Report Completed Mar. 26, 2012, Mailed Apr. 9, 2012, 8 pgs.

* cited by examiner

OPTICAL CONVERTER WITH ADC BASED CHANNELIZER FOR OPTICAL LNB SYSTEM

CROSS-REFERENCE TO RELATED APPLICATIONS

This application claims priority to U.S. Provisional Application 61/443,500 filed Feb. 16, 2011, the entirety of which is incorporated herein by reference.

FIELD OF THE INVENTION

The present invention relates to conversion of satellite signals to an intermediate (IF) frequency for content decoding and selection of data within satellite signals for content decoding utilizing an optical LNB or an optical converter.

BACKGROUND OF THE INVENTION

Figure 1:
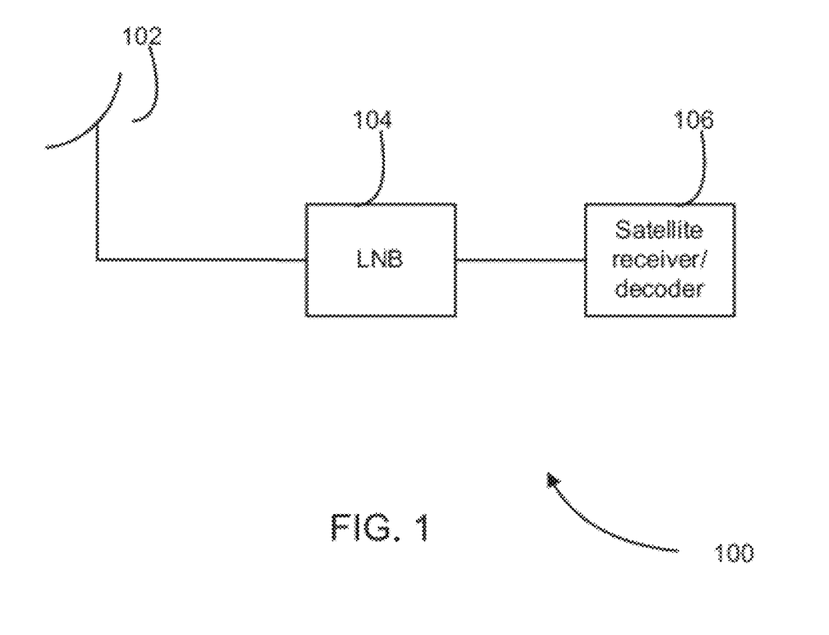
FIG. 1 illustrates a system diagram of a typical satellite downlink.

Content may be transmitted by a geosynchronous satellite communication network to users for decoding and playback. A system diagram of a typical satellite download link is illustrated in FIG. 1. The satellite downlink 100 includes a satellite antenna 102 connected to a low noise block converter (LNB) 104. The LNB is connected to a satellite receiver/decoder 106. The satellite can transmit signals including content channels modulated on a carrier. The content channels can be analog content channels or digital content channels. In many systems, data is modulated onto the same carrier using different polarizations. Where digital content channels are modulated onto a carrier, the digital data modulated on the carrier can include a plurality of digital content channels, each of which typically includes at least one video and/or audio stream.

In many instances, a signal containing multiple content channels is transmitted to a satellite network from an uplink facility. A transponder on the satellite then transmits a signal that can be received by a number of satellite antennas 102. The received signal is then passed to a LNB 104, which down converts the signal to an intermediate frequency (IF). Lastly, the IF signal is passed to a satellite receiver/decoder 106, such as a set top box, where the signal containing content is demodulated and decoded (i.e. audio and/or video) for playback.

In this way, information transmitted as relatively high frequency satellite signals, usually as microwave signals, may be converted to similar signals at a much lower frequency, usually known as an intermediate frequency (IF) compatible with the electronics of the decoding device and/or cabling used to connect an LNB to a satellite receiver/decoder. A content channel is the digital data modulated onto a carrier frequency within the IF signal. Users may then receive selected content channels as IF signals for decoding and use. Representations of the frequency spectra of signals during various stages in the down-conversion of satellite communication signals is illustrated FIGS. 2A, 2B and 2C.

Figure 2A:
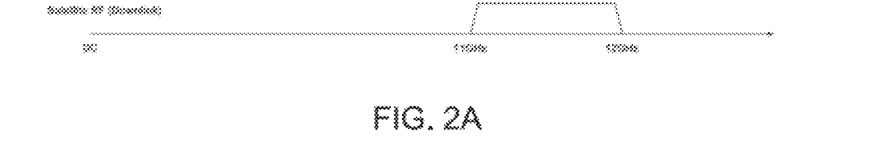
FIG. 2A illustrates a typical satellite radio frequency (RF) signal for downlinking.

Radio frequency (RF) signals are typically transmitted by a satellite to a receiver at high frequencies. A typical satellite radio frequency (RF) signal for downlinking is illustrated in FIG. 2A. As illustrated, the signal is transmitted at high frequencies, spanning from 11 GHz to 12 GHz. A satellite signal when received by a satellite signal receiver is usually weak after traveling great distances during transmission and is of a relatively high frequency. When signals are sent through coaxial cables, the higher the frequency, the greater the losses that occur in the cable per unit of length.

Figure 2B:
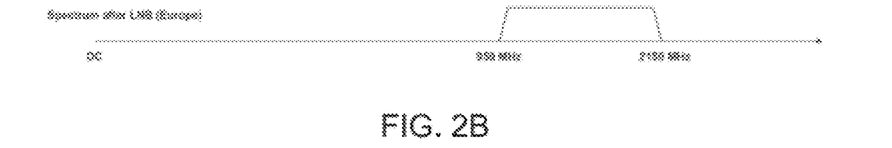
FIG. 2B illustrates the frequency spectrum of satellite signals when processed by a LNB in accordance with European standards.
Figure 2C:
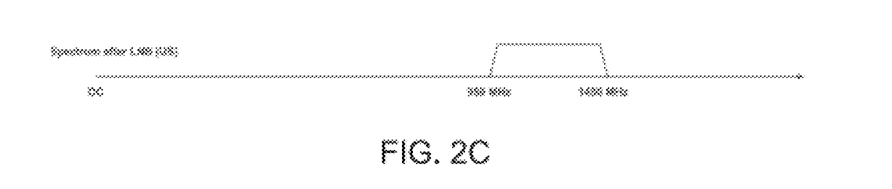
FIG. 2C illustrates the frequency spectrum of satellite signals when processed by a LNB in accordance with U.S. standards.

A LNB may be used to amplify and convert these high frequency signals to a lower, more manageable frequency. The frequency spectrum of satellite signals processed by a LNB is illustrated in FIGS. 2B and 2C. In Europe, the standard is often horizontal polarization and vertical polarization. In the U.S., the standard is often left circular and right circular polarization. The frequency band for each polarization is 10.7-12.75 GHz. The total bandwidth received at a satellite antenna is typically greater than 4 GHz. The frequency band for satellite signal transmission in a coaxial cable is 950-2150 MHz. In Europe, the frequency spectrum of LNB processed signals may be from 950 MHz to 2150 MHz (see FIG. 2B). In the United States (U.S.), the frequency spectrum of LNB processed signals may be from 950 MHz to 1450 MHz (see FIG. 2C).

Figure 2D:
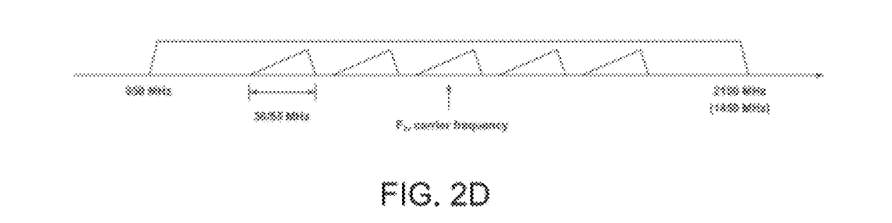
FIG. 2D illustrates the typical frequency spectrum for modulated digital data on a plurality of content channels within an L-Band IF signal generated by an LNB.

Signals containing content received from a satellite typically include multiple content channels in the frequency band of the carrier signal. Typical frequency spectrum for carrier frequencies of channels of encoded digital data carried by the IF signal processed by a typical LNB is illustrated in FIG. 2D. An LNB can separate the 4 GHz bandwidth into smaller bandwidth signals that are sent out instead of the full band. Here, the frequency band spans from 950 MHz to 2150 MHz or 1450 MHz and there are multiple 36/55 MHz content channels in this frequency band. In order for a user to decode selected content, an L-band tuner may be used to select the desired channel. For example, a certain carrier frequency may be selected where a 36/55 MHz band may be transferred to a decoding device for use by the user.

Figure 3:
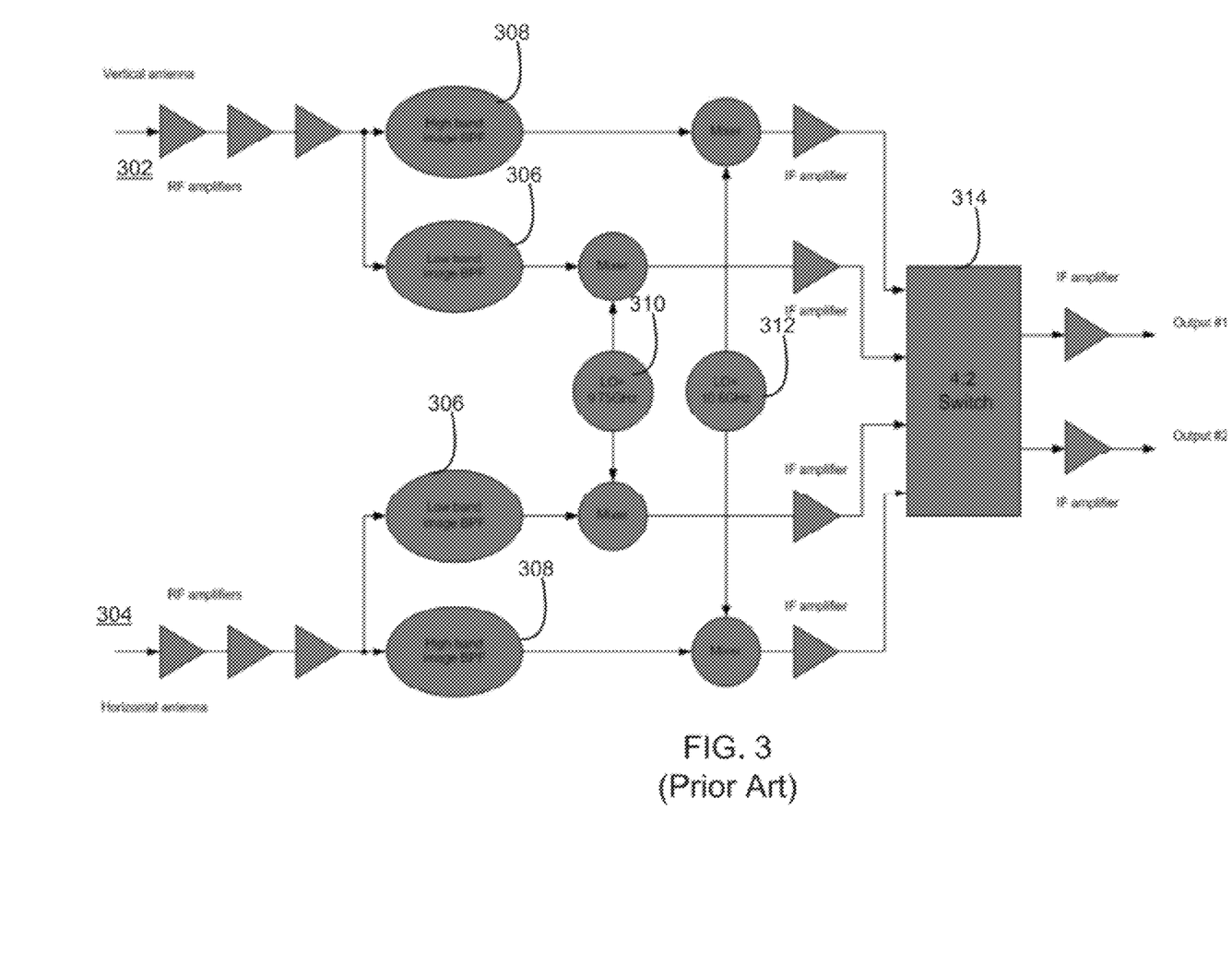
FIG. 3 illustrates a typical universal LNB with dual outputs.

LNBs can be implemented in many ways using many different LNB architectures. FIG. 3 illustrates a diagram of a typical universal LNB architecture with dual outputs. In this architecture, the LNB receives two RF input signals from the satellite. One signal is for the vertical polarization antenna 302 and the other is for the horizontal polarization antenna 304. For example, the frequency band of both signals may be from 10.7-12.75 GHz. The LNB first separates the signal into two bands with two band pass filters, a low band 306 (10.7-11.7 GHz) and a high band 308 (11.7-12.75 GHz). Low band signals are mixed down to 950-1950 MHz with local oscillator (LO) 310 at 9.75 GHz. The LO is the frequency used in the LNB to block convert the frequency of the satellite signal, or transponder frequency, to a lower frequency band. High band signals are mixed down to 1100-2150 MHz with LO 312 at 10.6 GHz. Output signals are selected from the four down converted L-band signals with a 4:2 multiplexer 314 in response to request for specific channels from the decode device. Using the Universal LNB illustrated in FIG. 3, viewers can only tune to content on two of the 1 GHz L-band channels at any time. Additional cables are required for users to watch content from more than two of the 1 GHz L-band channels.

Figure 4:
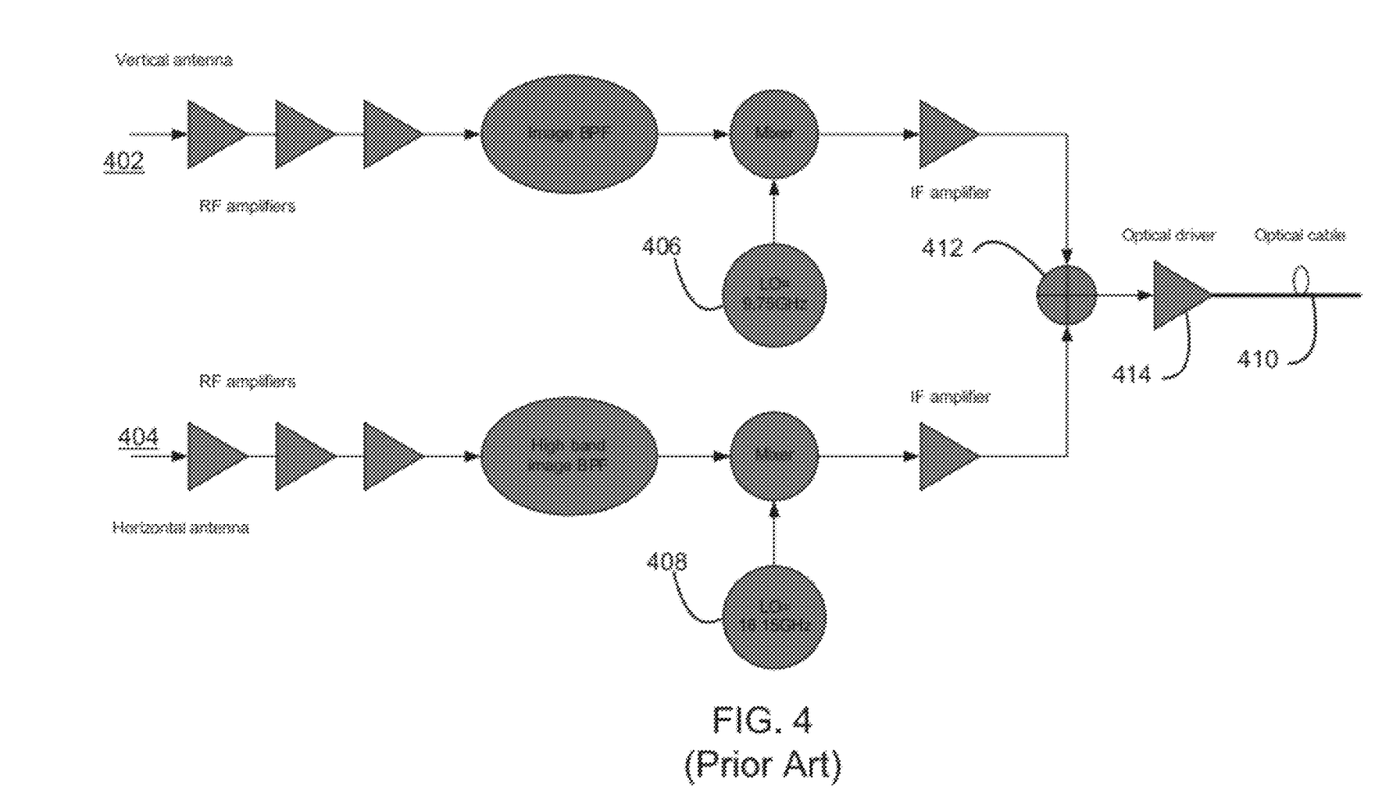
FIG. 4 illustrates a block diagram of a typical optical LNB.

Instead of utilizing multiple cables, however, coax cable can be replaced with optical cable. Optical cable is able to carry the full 4 GHz bandwidth (or even greater bandwidth in systems that receive signals from multiple satellite transponders). In order to use optical cable, an optical LNB can be utilized. Optical cable installation is also beneficial in buildings where no exiting cable television (CATV) cable is present. FIG. 4 illustrates a block diagram of a typical optical LNB. In the illustrated optical LNB architecture, the optical LNB receives 2 RF inputs. One is from the vertical polarization antenna 402 and the other is from the horizontal polarization antenna 404. In many instances, the frequency band of both signals is 10.7-12.75 GHz. The vertical polarized signal is mixed down to 0.95-3 GHz with a LO 406 at 9.75 GHz. The horizontal polarized signal is mixed down to 3.4-5.45 GHz with a LO 408 at 16.15 GHz. The two mixed down signals are combined into a single signal (412) and converted to an optical signal via an optical driver 414 and output through an optical cable 410. The output frequency for an optical LNB as illustrated here may be 0.95-5.45 GHz.

Figure 5:
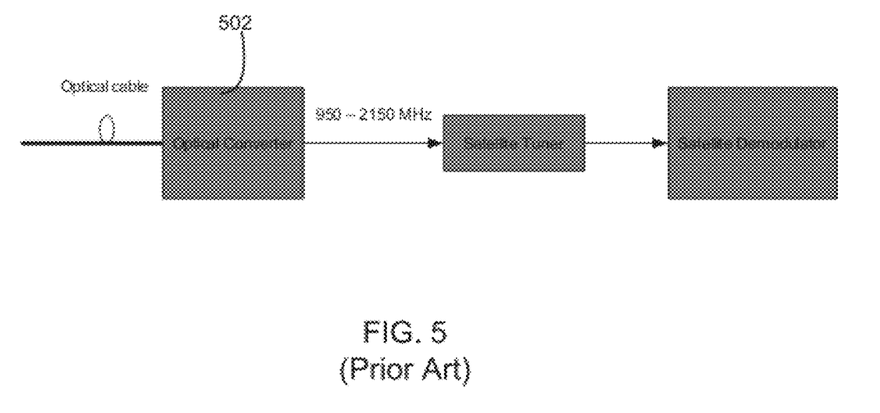
FIG. 5 illustrates a block diagram of a typical optical converter at the STB side for converting an optical signal to an RF signal.
Figure 6:
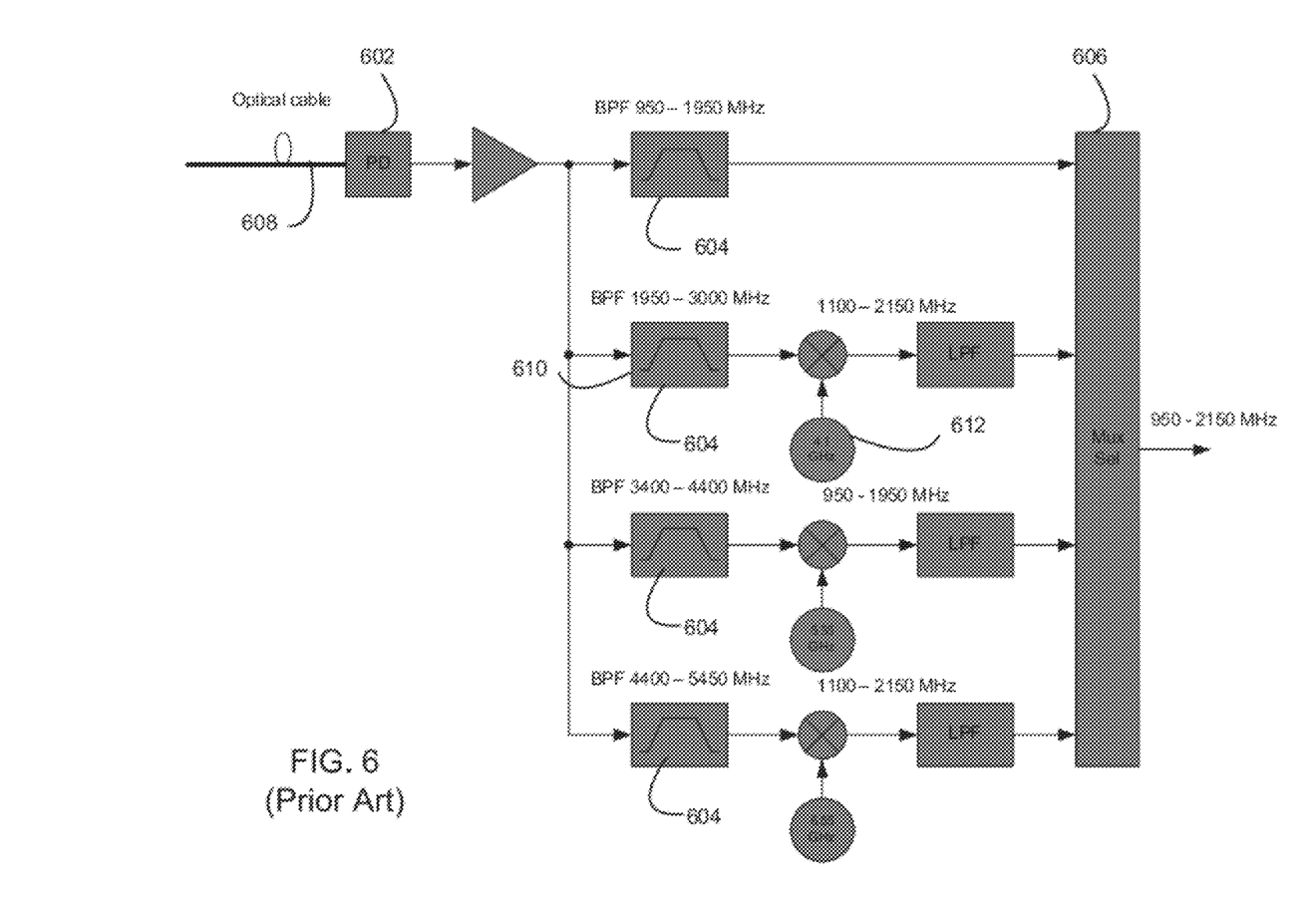
FIG. 6 illustrates a block diagram of a typical optical converter at the STB side.

Typically, satellite set top boxes (STB) are configured to receive L-band RF signals at 950-2150 MHz. In order to interface with a satellite STB, an optical converter is used for each STB to convert the optical signal back to an RF signal. FIG. 5 illustrates a typical block diagram of an optical converter 502 at the STB side for converting an optical signal to a RF signal. The function of the optical converter is to convert the optical signal into a RF signal and to mix at least a portion of the RF signal to the L-band, for example at 950-2150 MHz. FIG. 6 shows a block diagram of a typical optical converter at the STB side. In this optical converter architecture, the optical signal received from the optical cable 608 is converted to a RF signal using a photo detector (PD) 602. The full four GHz band is separated into four one GHz signals with four band-pass filters 604. Each filtered signal is frequency translated to the L-band, with a mixer if necessary. The final output is selected between these four L-band signals with a multiplexer (Mux Sell 606.

In the system illustrated in FIG. 6, to select frequency band 1950-3000 MHz, the RF signal is first filtered by a band-pass filter 610 for 1950-3000 MHz. The filtered signal is then mixed down 1100-2150 MHz with LO 612 at 4.1 GHz. The multiplexer (Mux Sell then selects the content channel associated with the signal at frequency band 1950-3000 MHz.

SUMMARY OF THE INVENTION

Systems and methods in accordance with embodiments of the invention convert satellite signals to an intermediate frequency (IF) and select modulated data within the satellite signals for content decoding. One embodiment includes an optical low noise block converter (LNB) including a digital channelizer switch configured to select at least one content channel from an input signal including a plurality of content channels modulated onto a carrier, the optical LNB including: a plurality of inputs, where each of the plurality of inputs is configured to receive an input signal including a plurality of content channels modulated on a carrier; a plurality of mixers, where each mixer is connected to an input and is configured to down convert the content channels to an intermediate frequency signal; and a digital channelizer switch. The digital channelizer switch includes a plurality of high speed analog to digital converters, where each high speed analog to digital converter is configured to digitize an intermediate frequency signal generated by one of the mixers; a plurality of digital channelizers, where each digital channelizer is configured to digitally tune a content channel from a digitized intermediate frequency signal generated by one of the high speed analog to digital converters; a multiplexer configured to select digitized intermediate frequency signals generated by the plurality of high speed analog to digital converters as inputs to the plurality of digital channelizers; a common combiner configured to digitally combine the plurality of content channels digitally tuned from at least one of the digitized intermediate frequency signals by the plurality of digital channelizers; and a high speed digital to analog converter configured to generate an analog output signal using the output of the common combiner. In addition, the optical LNB includes an optical driver configured to convert the analog output signal from the high speed digital to analog converter to an optical output.

In a further embodiment, the mixer includes a local oscillator.

In another embodiment, the content channel includes a digital content channel.

In a still further embodiment, the content channel includes an analog content channel.

In still another embodiment, the frequency of the input signal is in the range from 10.7 GHz to 12.75 GHz.

In a yet further embodiment, the frequency of the intermediate frequency signal is in the range from 0.2 GHz to 2.25 GHz.

In yet another embodiment, the frequency of the analog output signal is in the range from 950 MHz to 2150 MHz.

In a further embodiment again, the frequency of the analog output signal is in the range from 950 MHz to 1450 MHz.

In another embodiment again, the high speed analog to digital converter is configured to sample the intermediate frequency signal at a frequency at least twice the highest frequency of the intermediate frequency signal.

A further additional embodiment includes an optical converter with a digital channelizer switch configured to select at least one content channel from an input signal including a plurality of content channels modulated onto a carrier, the optical converter including: a photo detector configured to generate a radio frequency (RE) signal from an input signal found on an optical cable, the input signal including a plurality of content channels modulated on a carrier as an intermediate frequency signal; a digital channelizer switch including: a high speed analog to digital converters configured to digitize the radio frequency signal generated by the photodiode; at least one digital channelizer, where each digital channelizer is configured to digitally tune a content channel from the digitized radio frequency signal generated by the high speed analog to digital converter; a multiplexer configured to select digitized radio frequency signals generated by the plurality of high speed analog to digital converters as inputs to the plurality of digital channelizers; a common combiner configured to digitally combine the plurality of content channels digitally tuned from the digitized radio frequency signal by the plurality of digital channelizers; and a high speed digital to analog converter configured to generate an analog output signal using the output of the common combiner.

In another additional embodiment, the photo detector is selected from the group consisting of photodiodes, photomultiplier tubes and phototransistors.

In a still yet further embodiment, the content channel includes a digital content channel.

In still yet another embodiment, the content channel includes an analog content channel.

In a still further embodiment again, the frequency of the analog output signal is in the range from 950 MHz to 2150 MHz.

In a still another embodiment again, the frequency of the analog output signal is in the range from 950 MHz to 1450 MHz.

In a still further additional embodiment, the high speed analog to digital converter is configured to sample the radio frequency signal at a frequency at least twice the highest frequency of the radio frequency signal.

Still another additional embodiment includes a method of selecting at least one content channel from at least one input signal using an optical LNB with a digital channelizer switch, where each input signal includes a plurality of content channels modulated on a carrier, the method including: receiving at least one input signal at the optical LNB, where each input signal includes a plurality of content channels modulated on a carrier; down converting the plurality of content channels on each of the at least one input signals to an intermediate frequency signal using at least one mixer; digitizing each of the intermediate frequency signals using at least one high speed analog to digital converter; digitally tuning at least one content channel from the at least one digitized intermediate frequency signals using at least one digital channelizer; generating an analog output signal from at least one digital content channel digitally tuned from a digitized intermediate frequency signal using at least one digital to analog converter; and converting the analog output signal from the high speed digital to analog converter to an optical output using an optical driver.

A yet further embodiment again includes a method of selecting at least one content channel from an input signal including a plurality of content channels modulated on a carrier, the method including: receiving at least one input signal using an optical low noise block converter (LNB) including a digital channelizer, where each input signal includes a plurality of content channels modulated on a carrier; down converting the plurality of content channels on each of the at least one input signals to an intermediate frequency signal using at least one mixer in the optical LNB; combining the plurality of intermediate frequency signals using a common combiner in the optical LNB; converting the combined plurality of intermediate frequency signals to an optical signal for transmission over an optical cable using an optical driver in the optical LNB; converting the optical signal to a radio frequency signal using a photo detector in an optical converter; digitizing the radio frequency signal using at least one high speed analog to digital converter using an analog to digital converter in the optical converter; digitally tuning at least one content channel from the at least one digitized radio frequency signal using at least one digital channelizer in the optical converter; and generating an analog output signal from at least one digital content channel digitally tuned from a digitized intermediate frequency signal using a digital to analog converter in the optical converter.

DISCLOSURE OF THE INVENTION

Turning now to the drawings, systems and methods for converting satellite signals to an IF frequency signal, and selecting modulated data within the satellite signals for content decoding are disclosed in accordance with embodiments of the invention. In various embodiments, analog circuitry is utilized to generate an IF signal that is then digitized to enable selection of the modulated digital data within the received satellite signal to provide to a decoder device using digital signal processing techniques. Once selection is performed using digital signal processing, the selected modulated digital data is converted back to an analog signal and output by the optical LNB. In several embodiments, a digital channelizer is used to separate the content of a single content channel (i.e. digital data modulated onto a specific carrier frequency) from the signals received via the satellite downlink. A digital channelizer can also be utilized in an optical LNB and in optical converters in accordance with embodiments of the invention. Optical LNBs in accordance with many embodiments of the invention can utilize analog to digital converters (ADC) such as the ADCs developed by Mobius Semiconductor Inc. of Irvine, Calif., which can sample at multiple GHz and dissipate less power than a traditional RF mixer based tuner. Down converted satellite band signals may typically be between 950-2150 MHz. The sample rate needs to be at least two times the maximum frequency. Therefore, optical LNBs in accordance with certain embodiments of the invention use an ADC or DACs developed by Mobius Semiconductor Inc. with a maximum sample rate of 6 GHz. In addition, optical converters in accordance with many embodiments of the invention use an ADC developed by Mobius Semiconductor, Inc. with a maximum sampling rate of 12 GHz.

In a number of embodiments, utilizing a high frequency low power analog to digital converter to digitize L-band signals, a digital channelizer to select modulated digital data from the digitized signal, and a digital to analog converter to generate an analog output signal can significantly reduce the power consumption and component cost of an optical LNB. Certain embodiments provide for reducing most of the RF circuitry from an optical converter, such as the BPF and mixers. Analog RF circuitry consumes a significant amount of power in optical LNBs and optical converters. Typically, high performance analog RF components are also expensive. In addition, content channel switching may be done instantaneously without settling time due to usage of digital circuitry. In this way, optical LNBs and optical converters can be constructed in accordance with embodiments of the invention that overcome power and cost constraints that may be imposed by the use of analog components. Optical LNBs, optical converters, and the use of high speed low power analog to digital converters, and digital channelizers in accordance with embodiments of the invention are discussed further below.

Optical LNB with Integrated Digital Channelizer Switch

Figure 7:
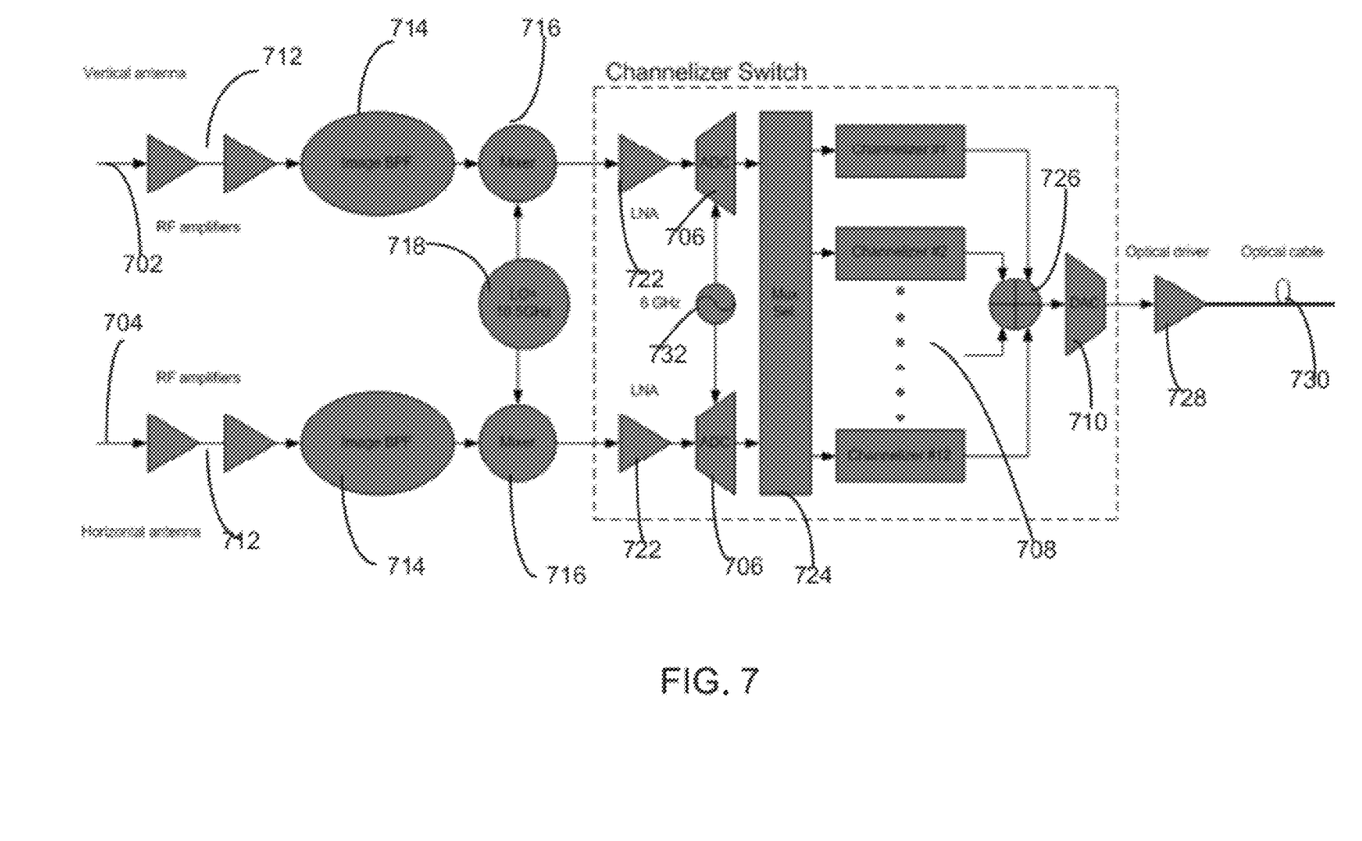
FIG. 7 illustrates an optical LNB including an integrated channelizer switch in accordance with an embodiment of the invention.

An optical LNB in accordance with many embodiments of the invention may utilize an optical driver with an integrated channelizer switch in many different ways. FIG. 7 illustrates an optical LNB including an integrated channelizer switch in accordance with an embodiment of the invention. In the optical LNB of FIG. 7, an input for the vertical antenna 702 and an input for the horizontal antenna 704 are each connected to different RF amplifiers 712. In many embodiments, the LNB receives two RF input signals 702, 704 from a satellite. One signal is for the vertical polarization antenna and the other is for the horizontal polarization antenna. For example, the frequency band of both signals may be from 10.7-12.75 GHz. In other embodiments, the frequency band of the signals is the C-band (4-6 GHz), the X-band (8 GHz), the Ka-band (20-30 GHz) and/or any other band appropriate to a specific application. Each of the RF amplifiers 712 are connected to a different image band pass filter (BPF) 714. Each band pass filter 714 is connected to a different mixer 716. Each mixer 716 is associated to a common local oscillator (LO) 718. Each mixer 716 is connected to a channelizer switch 720 via a respective input to different low noise amplifiers (LNA) 722. Each LNA 722 is connected to a different analog to digital converter (ADC) 706. Each ADC 706 is associated with a common oscillator 718 at 6 GHz. Each ADC 706 is also connected to a common multiplexer, or multiplexer selector (Mux Sell 724. For ease of discussion, the terms multiplexers and multiplexer selectors are interchangeably used. The multiplexer 724 is connected to twelve different channelizers 708. Each channelizer 708 is combined (726) onto a single common channel. The combined signal on the common channel is provided to a DAC 710. The DAC 710 is connected to an optical driver 728. The optical driver 728 is connected to an optical cable 730 for output.

In embodiments of the invention, digital channelizers are used to select the desired content channels, which then can be converted into an optical signal including each of the selected channels using a digital to analog converter and read by an optical decoding device. In certain embodiments, the optical decoding device may generally be an optical-electrical converter or a photo detector converter or any device capable of converting an optical signal into an RF signal including photodiodes, photomultiplier tubes and phototransistors. In the illustrated embodiment, there are twelve channelizers 708 and therefore twelve content channels may be selected out of the satellite signal, and converted into an optical L-band signal using a digital to analog converter and optical driver. Although twelve channelizers 708 are illustrated in FIG. 7, any number of channelizers can be utilized as appropriate to a specific application in accordance with embodiments of the invention. In addition, many applications involve providing two or more signals to the optical LNB received via one or more satellites in accordance with embodiments of the invention.

In many embodiments, scalability is enhanced over traditional optical LNB implementations. LNBs in accordance with embodiments of the invention can provide for the output of an arbitrary number of content channels with the addition of additional digital channelizers. Traditional implementations typically utilize one tuner and one SAW filter per content channel output. Also, embodiments with the digital channelizer can pack content channels for output closer together than in an all analog LNB due to the limitations imposed on analog LNBs by analog filler roll-off and the fact that sharp fillers can be implemented in the digital circuit.

Optical Converter with Digital Channelizer Switch

Figure 8:
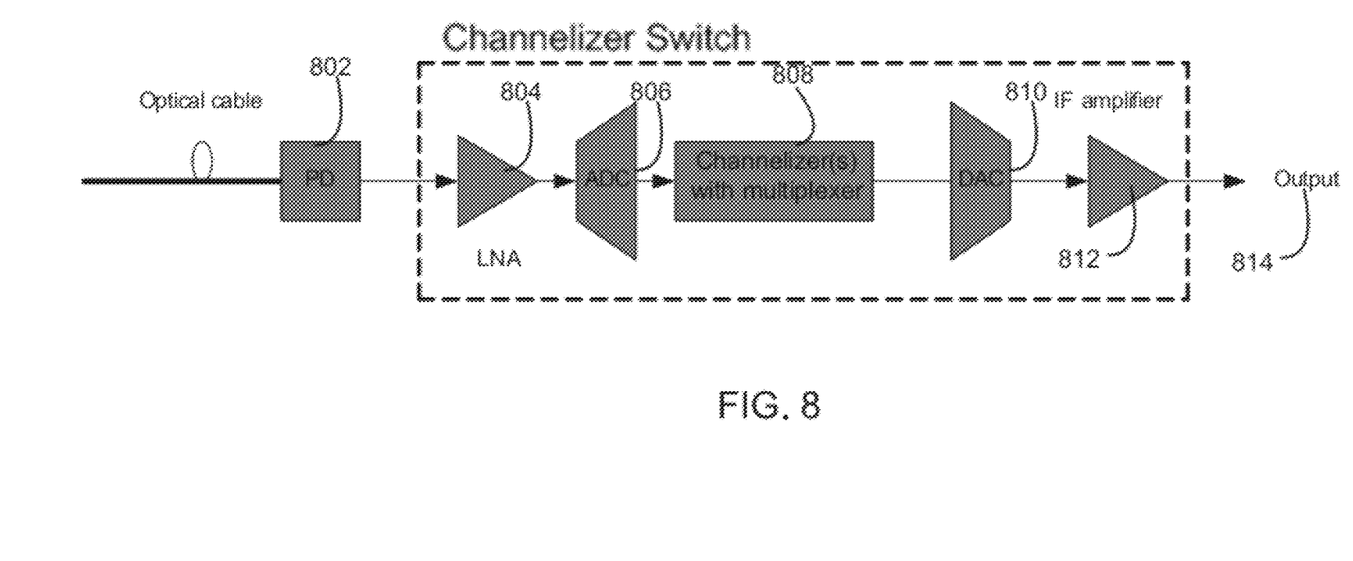
FIG. 8 illustrates an optical converter including an ADC based channelizer in accordance with an embodiment of the invention.

Digital channelizer switches in accordance with many embodiments of the invention may be utilized in conjunction with an optical converter. FIG. 8 illustrates an optical converter including an ADC based channelizer switch in accordance with an embodiment of the invention. In the optical converter architecture of FIG. 8, a photo detector (PD) 802 is connected to a low noise amplifier (LNA) 804. The LNA 804 is connected to an analog to digital converter (ADC) 806. The ADC 806 is connected to a channelizer with multiplexer 808. The channelizer with multiplexer 808 in many embodiments can be of the same configuration as the channelizer and multiplexer combination of FIG. 7 where a multiplexer is connected to a number of different channelizers. In several embodiments, each channelizer of the channelizer with multiplexer 808 is combined onto a single common channel that can be provided to a DAC 810. The channelizer with multiplexer 808 is thereby connected to a digital to analog converter (DAC) 810. The DAC 810 is connected to an IF amplifier 812. The IF amplifier 812 is connected to an output 814.

In certain embodiments, the optical signal is converted to an RF signal with a photo detector 802. In various embodiments, the function of the photo detector may be generally performed by an optical-electrical converter or any device capable of converting an optical signal into an RF signal including photodiodes, photomultiplier tubes and phototransistors. The optical signal typically also contains numerous selectable content channels. The full 4 GHz band is sampled by an ADC 806 with a sample frequency of 12 GHz. The desired output frequency band containing the desired content channel is selected with digital circuitry, such as a channelizer with multiplexer 808 and converted to L-band signal with a high speed DAC 810 sampled at 6 GHz.

In many embodiments, digital circuitry 808 takes the place of functions performed by analog circuitry in conventional optical converter architectures. For example, the number of analog circuits, such as RF mixers, local oscillators, and band pass fillers, are reduced in comparison with the equivalent analog circuit shown in FIG. 6. Replacement of analog components with digital components can provide savings in power and cost. Analog RF switching circuitry can also have a settling time when switching between different inputs. An equivalent digital implementation in accordance with an embodiment of the invention may have switching times of the order of one clock cycle, which may be in the nanosecond range. The fast switching time can provide a more seamless user experience.

Digital Channelizer Switch

Figure 9:
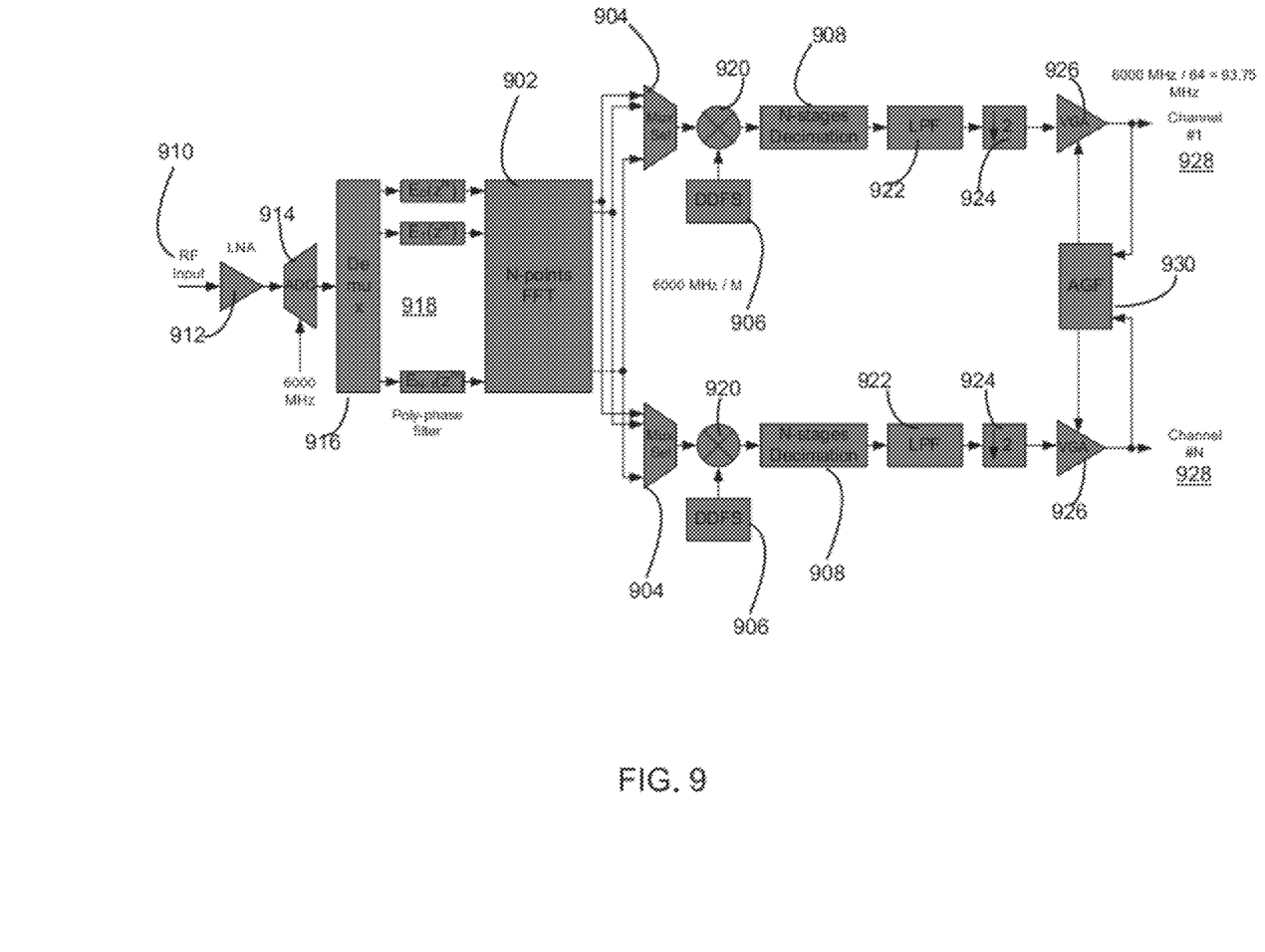
FIG. 9 illustrates a channelizer switch in accordance with an embodiment of the invention.

Digital channelizer switches in accordance with many embodiments of the invention can utilize a single RF input for digital selection of any number of channels from the RF input. FIG. 9 illustrates a channelizer switch in accordance with an embodiment of the invention. In the channelizer switch illustrated in FIG. 9, an RF input 910 is connected to an LNA 912. The LNA 912 is connected to an ADC 914. The ADC 914 is connected to a demultiplexer (demux) 916. The demux 916 is connected to poly-phase fillers 918. Each poly-phase filler 918 is connected to a common N-points FFT 902. The N-points FFT 902 is connected to two multiplexers (Mux Sell 904. Each multiplexer 904 is connected to a different mixer 920. Each mixer 920 is also connected with a different direct digital frequency synthesis (DDFS) 906 along with different N-stage decimation 908. Each N-stage decimation 908 is connected to a low pass filter (LPF) 922. Each LPF 922 is connected to a decimator 924 for down sampling by two. Each decimator 924 is connected to a different variable gain amplifier (VGA) 926. Each VGA 926 is connected to separate channel outputs 928. Both VGAs 926 and both channel outputs 928 are controlled with an automatic gain control (AGC) 930. Although not illustrated in FIG. 9, in several embodiments, each channel output 928 can also be combined onto a single common channel using a combiner that can be provided to a digital to analog converter, all as part of the digital channelizer switch.

In many embodiments, a Fast Fourier Transform (FFT) based channelizer 902 is used for coarser frequency tuning. For example, the outputs may be N_fft/2 overlapped channels at 6.0 GHz/M, (i.e. where M in FIG. 9 is chosen to be N_fft/4). There may be two choices for N_fft: 32 and 64. A poly-phase filler may be used for better pass-band and stop-band response of the filter bank. One example of a poly-phase filter design is the Chebyshev window. The window length may be equal to N_fft for a simple implementation. In other embodiments, any of a number of different filters can be utilized in the band pass filtering of the channels. Given a real input, only half of the FFT outputs are needed. The FFT Channelizer 902 provides outputs to the multiplexer (Mux Sell 904. For example, there may be 32 mux for selecting N_fft/2 channelizer outputs for each desired channel. There may also be DDFS 906 based fine frequency tuning for each content channel where each fine frequency tuning block includes one complex multiplier and one direct digital frequency synthesis DDFS running at 6.0 GHz/M. The illustrated embodiment also features decimation filters 908 and adjacent channel interference (ACI) rejection filters. There may be multiple stages of decimation by two filters to bring the sample rate down to 93.75 MHz. There may also be three types of decimation by two filters used in this design. Also, four fixed coefficients filters may be used for ACI rejection. For example, a half-band, ⅔ band, third-band and a quarter-band. Lastly, this embodiment features a variable gain stage and automatic gain control (AGC), where variable gain may be at the output stage and a single AGC processing unit is used for all 32 channels' output gain control.

Therefore, the channelizer switch illustrated in FIG. 9 is able to take an RF input 910 and digitally select a number of content channels within a satellite signal from the RF input 910 for content decoding. Although a specific embodiment of a channelizer switch is illustrated in FIG. 9, any of a variety digital signal processing circuits can be utilized to digitally select one or more content channels within a digitized satellite signal in accordance with embodiments of the invention.

Although the present invention has been described in certain specific embodiments, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. An optical low noise block (LNB) including a digital channelizer switch configured to select at least one content channel from an input signal comprising a plurality of content channels modulated onto a carrier, the optical LNB comprising:
   a plurality of inputs, where each of the plurality of inputs is configured to receive an input signal comprising a plurality of content channels modulated on a carrier;
   a plurality of mixers, where each mixer is connected to an input and is configured to down convert the content channels to an intermediate frequency signal;
   a digital channelizer switch comprising:
      a plurality of high speed analog to digital converters, where each high speed analog to digital converter is configured to digitize an intermediate frequency signal generated by one of the mixers;
      a multiplexer configured to select digitized intermediate frequency signals generated by the plurality of high speed analog to digital converters as inputs to the plurality of digital channelizers;
      a plurality of digital channelizers, where each digital channelizer is configured to digitally tune a content channel from the digitized intermediate frequency signal received from the multiplexer and comprises:
         at least one poly-phase filter,
         an N-points Fast Fourier Transform,
         a plurality of selectors, wherein each selector is operable to select, among a plurality of outputs of the N-points Fast Fourier Transform, an output corresponding to a particular content channel, and
         a plurality of decimators, wherein each one of the plurality of decimators is operable to apply one or more stages of decimation to an output of a corresponding one of the plurality of selectors;
      a common combiner configured to digitally combine the plurality of content channels digitally tuned from at least one of the digitized intermediate frequency signals by the plurality of digital channelizers; and
      a high speed digital to analog converter configured to generate an analog output signal using the output of the common combiner; and
   an optical driver configured to convert the analog output signal from the high speed digital to analog converter to an optical output.

2. The optical LNB of claim 1, wherein the mixer comprises a local oscillator.

3. The optical LNB of claim 1, wherein the content channel comprises a digital content channel.

4. The optical LNB of claim 1, wherein the content channel comprises an analog content channel.

5. The optical LNB of claim 1, wherein the frequency of the input signal is in the range from 10.7 GHz to 12.75 GHz.

6. The optical LNB of claim 1, wherein the frequency of the intermediate frequency signal is in the range from 0.2 GHz to 2.25 GHz.

7. The optical LNB of claim 1, wherein the frequency of the analog output signal is in the range from 950 MHz to 2150 MHz.

8. The optical LNB of claim 1, wherein the frequency of the analog output signal is in the range from 950 MHz to 1450 MHz.

9. The optical LNB of claim 1, wherein each high speed analog to digital converter is configured to sample the intermediate frequency signal at a frequency at least twice the highest frequency of the intermediate frequency signal and has a maximum sample rate of 6 GHz.

10. An optical converter with a digital channelizer switch configured to select at least one content channel from an input signal comprising a plurality of content channels modulated onto a carrier, the optical converter comprising:
   a photo detector configured to generate a radio frequency (RE) signal from an input signal found on an optical cable, the input signal comprising a plurality of content channels modulated on a carrier as an intermediate frequency signal;
   a digital channelizer switch comprising:
      a high speed analog to digital converter configured to digitize the radio frequency signal generated by the photo diode;
      a plurality of digital channelizers, where each digital channelizer is configured to digitally tune a content channel from the digitized radio frequency signal and comprises:
         at least one poly-phase filter,
         an N-points Fast Fourier Transform,
         a plurality of selectors, wherein each selector is operable to select, among a plurality of outputs of the N-points Fast Fourier Transform, an output corresponding to a particular content channel, and
         a plurality of decimators, wherein each one of the plurality of decimators is operable to apply one or more stages of decimation to an output of a corresponding one of the plurality of selectors; and
a high speed digital to analog converter configured to generate an analog output signal using the output of the at least one channelizer with multiplexer.

11. The optical converter of claim 10, wherein the photo detector is selected from the group consisting of photodiodes, photomultiplier tubes and phototransistors.

12. The optical converter of claim 10, wherein the content channel comprises a digital content channel.

13. The optical converter claim 10, wherein the content channel comprises an analog content channel.

14. The optical converter of claim 10, wherein the frequency of the analog output signal is in the range from 950 MHz to 2150 MHz.

15. The optical converter of claim 10, wherein the frequency of the analog output signal is in the range from 950 MHz to 1450 MHz.

16. The optical converter of claim 10, wherein the high speed analog to digital converter is configured to sample the radio frequency signal at a frequency at least twice the highest frequency of the radio frequency signal and has a maximum sample rate of 6 GHz.

17. A method of selecting at least one content channel from at least one input signal using an optical LNB with a digital channelizer switch, where each input signal comprises a plurality of content channels modulated on a carrier, the method comprising:
receiving at least one input signal at the optical LNB, where each input signal comprises a plurality of content channels modulated on a carrier;
down converting the plurality of content channels on each of the at least one input signal to an intermediate frequency signal using at least one mixer;
digitizing the intermediate frequency signal using at least one high speed analog to digital converter;
digitally tuning at least one content channel from the digitized intermediate frequency signal using at least one digital channelizer comprising at least one poly-phase filter and an N-points Fast Fourier Transform, where digitally tuning at least one content channel comprises filtering the digitized intermediate frequency signals using the at least one poly-phase filter and tuning at least one content channel using the N-points Fast Fourier Transform;
processing each signal from the poly-phase filters with a common N-points Fast Fourier Transform;
selecting, by each of a plurality of selectors, among a plurality of outputs of the N-points Fast Fourier Transform, an output corresponding to a particular content channel;
applying, to each of the selected outputs, one or more stages of decimation;
generating an analog output signal from at least one digital content channel digitally tuned from a digitized intermediate frequency signal using at least one digital to analog converter; and
converting the analog output signal from the high speed digital to analog converter to an optical output using an optical driver.

18. A method of selecting at least one content channel from an input signal comprising a plurality of content channels modulated on a carrier, the method comprising:
receiving at least one input signal using an optical low noise block converter (LNB) including a digital channelizer, where each input signal comprises a plurality of content channels modulated on a carrier;
down converting the plurality of content channels on each of the at least one input signals to an intermediate frequency signal using at least one mixer in the optical LNB;
combining the plurality of intermediate frequency signals using a common combiner in the optical LNB;
converting the combined plurality of intermediate frequency signals to an optical signal for transmission over an optical cable using an optical driver in the optical LNB;
converting the optical signal to a radio frequency signal using a photo detector in an optical converter;
digitizing the radio frequency signal using at least one high speed analog to digital converter using an analog to digital converter in the optical converter;
digitally tuning at least one content channel from the at least one digitized radio frequency signals using at least one digital channelizer in the optical converter, wherein:
the at least one digital channelizer comprises at least one poly-phase filter and an N-points Fast Fourier Transform, a plurality of selectors, and a plurality of decimators; and
digital tuning at least one content channel comprises:
filtering the at least one digitized radio frequency signals using the poly-phase filter,
tuning at least one content channel using the N-points Fast Fourier Transform,
selecting, via each one of the plurality of selectors, among a plurality of outputs of the N-points Fast Fourier Transform, where output of each selector corresponds to a particular content channel, and
applying, via each one of the plurality of decimators, one or more stages of decimation to an output of a corresponding one of the plurality of selectors; and
generating an analog output signal from at least one digital content channel digitally tuned from a digitized intermediate frequency signal using a digital to analog converter in the optical converter.

* * * * *